United States Patent
Bhogal et al.

(10) Patent No.: US 7,290,220 B2
(45) Date of Patent: Oct. 30, 2007

(54) METHOD AND APPARATUS FOR NON-SEQUENTIAL ACCESS OF FORM FIELDS

(75) Inventors: Kulvir Singh Bhogal, Fort Worth, TX (US); Nizamudeen Ishmael, Jr., Austin, TX (US); Rohit R. Sahasrabudhe, Louisville, KY (US); Mandeep Singh Sidhu, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 10/406,663

(22) Filed: Apr. 3, 2003

(65) Prior Publication Data

US 2004/0196314 A1 Oct. 7, 2004

(51) Int. Cl.
*G06F 3/00* (2006.01)
(52) U.S. Cl. ............... 715/827; 715/847; 715/760
(58) Field of Classification Search .......... 715/827, 715/847, 760, 767; 345/172
See application file for complete search history.

(56) References Cited

U.S. PATENT DOCUMENTS

| | | | |
|---|---|---|---|
| 5,525,978 A * | 6/1996 | York et al. ............... 341/22 |
| 5,640,501 A | 6/1997 | Turpin | |
| 5,704,029 A | 12/1997 | Wright, Jr. | |
| 5,721,850 A * | 2/1998 | Farry et al. ............ 715/700 |
| 5,742,836 A | 4/1998 | Turpin et al. | |
| 5,796,404 A * | 8/1998 | Gentner ............... 715/823 |
| 6,078,323 A * | 6/2000 | Gest ..................... 715/711 |
| 6,084,585 A | 7/2000 | Kraft et al. | |
| 7,188,318 B2 * | 3/2007 | Spisak ................. 715/827 |
| 2002/0036620 A1 * | 3/2002 | Tervo .................. 345/172 |
| 2002/0198935 A1 | 12/2002 | Crandall, Sr. et al. | |

FOREIGN PATENT DOCUMENTS

JP 10254972 A 9/1998

* cited by examiner

*Primary Examiner*—Sy D. Luu
(74) *Attorney, Agent, or Firm*—Duke W. Yee; Marilyn Smith Dawkins; Wayne P. Bailey

(57) ABSTRACT

A method and system for non-sequential access to fields in a window, document, form or template. When the window, document, form or template is opened for user input, the user activates the non-sequential mode of operation, such as by hitting a particular keystroke or sequence of keystrokes. Once the non-sequential mode of operation is activated, indicia appear in each of the possible input fields. The indicia indicate to the user what they must do in order to immediately move the cursor to that field, to effectuate moving the window focus to the desired field.

17 Claims, 4 Drawing Sheets

METHOD AND APPARATUS FOR NON-SEQUENTIAL ACCESS OF FORM FIELDS

BACKGROUND OF THE INVENTION

1. Technical Field

The present invention relates to computer and data processing systems, and more particularly relates to user interaction with a computer, data processing system or electronic device, and specifically relates to improved user input of data or other information into a computer, data processing system, or electronic device.

2. Description of Related Art

User interaction with a computer, data processing system, or other type of electronic device can be tedious and time consuming. Keyboards having the same layout as previously used on typewriters are still used with today's computers. Mice or other pointing devices are also used to interact with a computer, but such pointing devices are typically limited to just that—to point to something or select something on the computer screen or an electronic device's display.

Inputting of information into a form with predefined input fields is one way to reduce the amount of information, and associated time, required to capture user supplied information. In today's environment, a user moves between different fields in the form in a sequential fashion, by hitting a TAB key to advance to the next field, or by hitting the SHIFT and TAB keys concurrently to go back to the immediately preceding field in the form. Specifically, when a user presses the TAB key, the cursor moves between fields, from left-to-right and top-to-bottom in the window or form. When the cursor is on the bottom-rightmost field in the window or form, and a user presses the Tab key, the cursor is moved to the top-leftmost field in the window or form. When a user presses the BACKTAB key (Shift+Tab), the cursor moves between fields, from right-to-left, and bottom-to-top in the window or form. When the cursor is on the top-leftmost field in the window or form, and a user presses the BACKTAB key, the cursor is moved to the bottom-rightmost field in the window or form.

Alternatively, to avoid sequential access to the fields, a mouse can be used to move the cursor to the desired field. In this instance, the user must position the cursor over the desired field using the mouse, and then click on the left mouse button to specify that field as being active for receiving data input. However, use of a mouse for moving between input fields is inherently slow, since the user must move a hand off the keyboard, operate the mouse to move the cursor, and then return their hand back to the keyboard.

What is needed is a way to quickly move to different fields in a form in a non-sequential manner.

SUMMARY OF THE INVENTION

The present invention is directed to a method and system for non-sequential access to fields in a window, document, form or template. When the window, document, form or template is opened for user input, the user activates the non-sequential mode of operation, such as by hitting a particular keystroke or sequence of keystrokes. Once the non-sequential mode of operation is activated, indicia appear in each of the possible input fields. The indicia indicate to the user what they must do in order to immediately move the cursor to that field, to effectuate moving the window focus to the desired field.

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
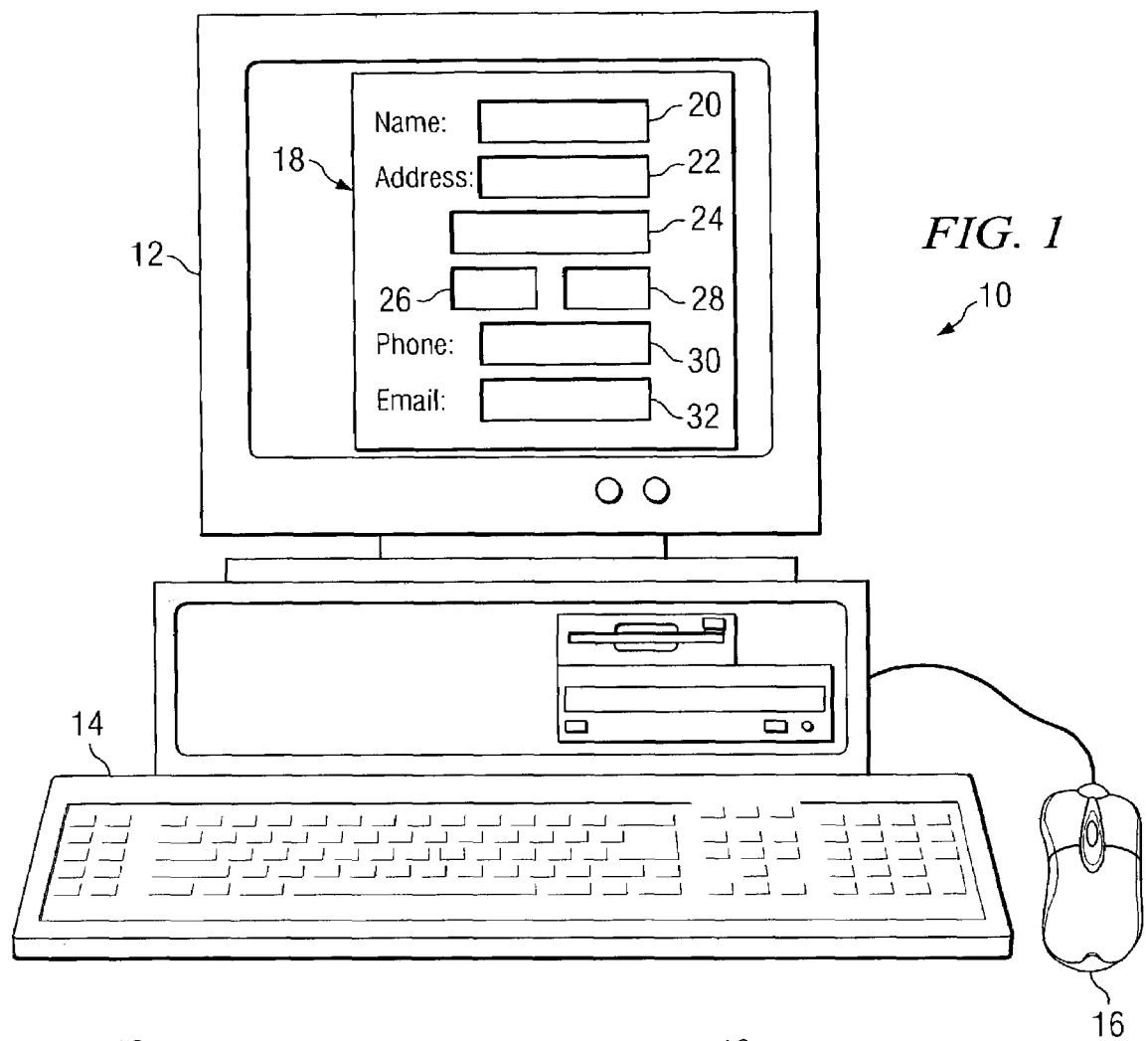
FIG. 1 depicts a typical input device for entering information into a window or form.
Figure 2:
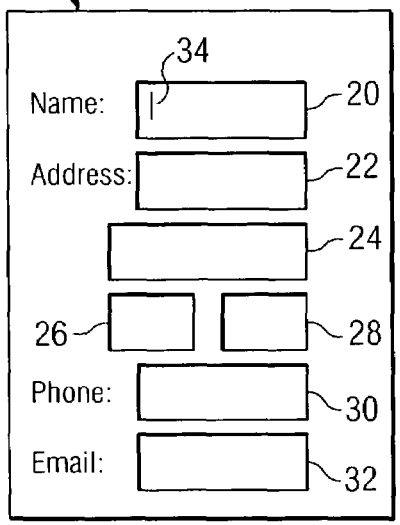
FIG. 2 depicts an exemplary form with a plurality of input fields, and a focus in the first input field of the window or form.

Referring to FIG. 1, there is shown a computer terminal 10 having a CRT or LED display 12, keyboard 14 and mouse 16. A document, form or template 18 is displayed in a window on the display 12. The document/form/template has a plurality of predefined input fields or input elements 20-32. A user typically moves the cursor to one of the fields to begin inputting information in such field. In prior systems, a mouse is typically used to move the cursor to the beginning field for user entry, and thereafter the TAB key is used to sequentially advance to the next field. For example, referring to FIG. 2, document 18 from FIG. 1 is shown in detail. Here, the user has used a mouse to move the cursor to field 20, and the cursor is shown at 34. In many types of computer systems, the cursor slowly flashes or blinks to make it more visually perceptible to the user. This indicates which form field is active for receiving input. Also, in many types of computer systems, when a user moves the cursor to an input field and then clicks the mouse over the field, the cursor moves to the far left side of the field to be ready for user input to commence on the left side of the field. Other systems may automatically position the cursor in the first entry field of a form when it is initially loaded, and thereafter use the TAB key for subsequent movement to the next sequential input field.

Figure 3:
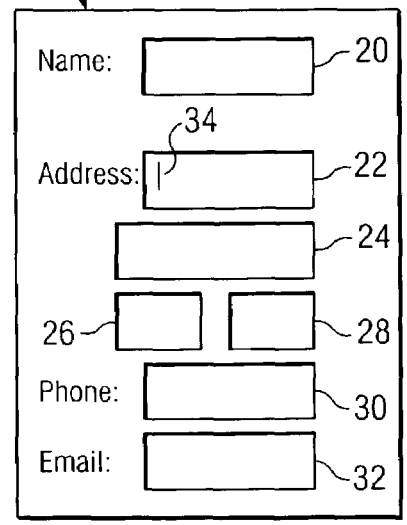
FIG. 3 depicts an exemplary form with a plurality of input fields, with the focus changed to another input field of the window or form.

FIG. 3 shows what happens when a user hits the TAB key when the cursor is active in an input field. In this instance, the cursor has moved to the next sequential input field 22. Repeatedly hitting the TAB key advances the cursor one field at a time to the next sequential input field, thus changing where input may be entered into the form. Alternatively, the mouse may be used to reposition the cursor to another field, as previously described.

In a multi-tasking computer environment, there may be multiple windows displayed on the display with each window corresponding to one of the multi-tasks that are running. At any time on an X Windows terminal, at most one window is sensitive to keystrokes from the keyboard. The sensitive window is said to have the input focus. Giving the input focus to a window is like "pointing the keyboard" at that window. X Windows highlights the frame of the one sensitive window having the input focus, while the other window frames are all a different color. To point a keyboard at a window, i.e. to give that window the input focus, the mouse pointer is moved anywhere over the window and the left mouse button is clicked once. Clicking on a window to give it the input focus also brings it out in front of other windows. This is useful if the window is partially obscured. Microsoft's Windows operating system operates in a similar fashion for window input focus. Similarly, for a form having a plurality of input fields or input elements, activating the cursor over one of these fields/elements is also known as setting, placing or moving the focus of the form or element to that input field or element.

The present invention is directed to improved user co-action with a computer or other type of electronic device. The present invention is intended to encompass input of information such as data into documents, forms or other types of computer related templates. For example, a web site may provide a form or user template that has a plurality of text entry fields. Text entry fields, also known as input elements, allow a user to enter non-formatted, and/or non-validated text. For instance, in doing a survey, and you wanted to give the user the option of entering his or her name, you could use a text entry field. The following example shows an HTML coding of a text entry field within a form that is resident on a web site.

```
<form METHOD=POST ACTION=
"http://www.wpb.net/bin/surveyform.cgi">
    <input TYPE="text" NAME="persons-name"
    SIZE="35" MAXLENGTH="35">
</form>
```

The TYPE parameter identifies the type of input field. In this example, the TYPE is "text" to identify a text entry field. The NAME parameter provides a field name that will be associated with the value is entered. This is important for the CGI (Common Gateway Interface) program to processes the data sent to it. The SIZE parameter tells the browser how large to make the Field. This is pretty self-explanatory. The MAXLENGTH parameter tells the browser how many characters maximum is allow to be entered in the field. Other types of forms, documents and templates have similar features for displaying text entry fields or elements, and capturing information such as text that is entered into such text entry fields or elements.

Figure 4:
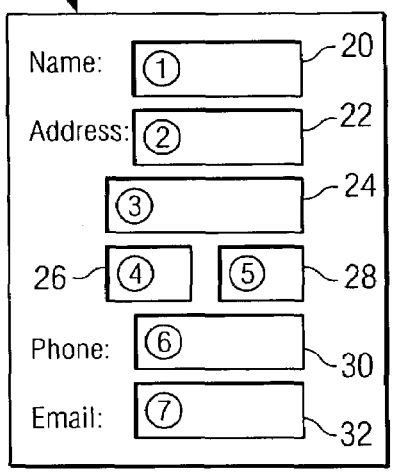
FIG. 4 depicts an exemplary form with a plurality of input fields each having a numeric indicia displayed therein.

The present invention allows a user to quickly jump to any input field defined in a document, form or template. As used herein, the term form will be used to encompass any type of window, document, form or template having defined input fields for data entry. The user first opens the form, such as by using a word processing program such as Word or WordPerfect to open the document, or by entering or linking to an internet or web address of where the form is located. The user then activates the quick jump feature, also referred to herein as a non-sequential field access mode of operation, which allows a user to go directly to a desired input field without requiring a sequential scrolling through intervening input fields using a TAB key, as previously described. This non-sequential input field access is invoked in the preferred embodiment by holding down a predefined invocation key on a keyboard or keypad. In the preferred embodiment, this non-sequential field access feature is invoked by holding down the ALT key on the keyboard or keypad. When the ALT key is pressed and held down, indicia appear in each or the input fields indicating what keystroke or other type of user action is required to position the cursor at that particular input field. For example, as shown in FIG. 4, while the ALT key is being held down—thus invoking the quick jump feature—a number appears in each of the input text fields 20-32. If the user then presses a key corresponding to the indicia in a particular input field, while continuing to hold down the ALT key, the cursor is moved to that particular field to allow immediate data entry into such field by the user. For example, if the user holds down the ALT key, to activate the indicia shown in FIG. 4, and then enters the numeric 6 key on the keyboard or keypad with the ALT key still active, the cursor immediately moves to entry field 30 to allow the user to immediately enter a phone number without having to sequentially scroll (using the TAB key) through each of intervening input fields 22, 24, 26 and 28. After the ALT-NUMBER key combination has been entered to invoke cursor relocation at the desired input field, the user releases the keys and then enters data into the input field using standard techniques. Since the ALT key is not being held down during this data entry activity, data entry occurs in normal fashion.

In the preferred embodiment, indicia presented in the input fields are highlighted to allow easy visual recognition by the user. For example, as shown in FIG. 4, the indicia presented in input fields 20-32 of form 18 are numbers which are highlighted by being circled. Other highlighting could be used, such as bolding the indicia or coloring the indicia a particular color other than the default font color of the form, such that the indicia are readily recognized by the user who is entering data.

Figure 5:
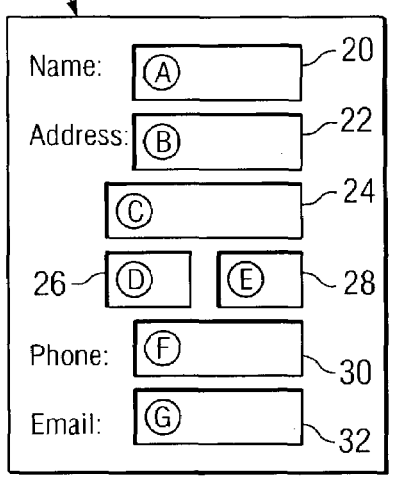
FIG. 5 depicts an exemplary form with a plurality of input fields each having a textual indicia displayed therein.

Letters could also be used as the indicia located in the input field boxes. For example, form 18 in FIG. 5 is shown to have letter indicia in each of input fields 20-32. A user holding down the ALT key and concurrently pressing the G letter key would immediately move the cursor to the Email input field 32 to allow immediate user input of data into this input field. In the more general case, any type of indicia could be presented in the input fields, so long as there is some correlation between the indicia being presented to the user, and the associated user response to invoke an action to move the cursor to that input field. For example, each input field could be presented in a particular unique color when the ALT key is pressed, and the user would select that color by pressing a key associated with the color of the desired input field.

In the preferred embodiment, the indicia presented for a given field is specified using the text entry field previously discussed. A text entry field keyword is used to specify what indicia is to be displayed for a given entry field. The following exemplifies such a text entry field keyword using HTML coding:

```
<form METHOD=POST ACTION="http://www.wpb.net/bin/
surveyform.cgi">
<input TYPE="text" NAME="per-name" SIZE="35"
MAXLENGTH="35" QTB="5">
```

-continued

```
</form>
```

In this example, keyword QTB (which stands for Quick Tab Value) specifies that the numeric 5 should be displayed in the text entry field when the quick tab feature has been activated. Use of a keyword for indicia specification is powerful in that is allows for arbitrary ordering of text entry field indicia, instead of sequentially numbering or lettering the fields from top to bottom or left to right. For example, the top leftmost text entry field could be programmed, via the text entry field QTB keyword described above, to display the numeric 5 in its field upon activation of the quick jump feature. The next text entry field could be programmed to display the numeric 1 in its field upon activation of the quick jump feature, thus enabling arbitrary ordering of the indicia to be displayed. Specifying text, color, or other indicia for display in a particular text input field can similarly be down with a QTB or similar text entry field keyword.

Figure 6:
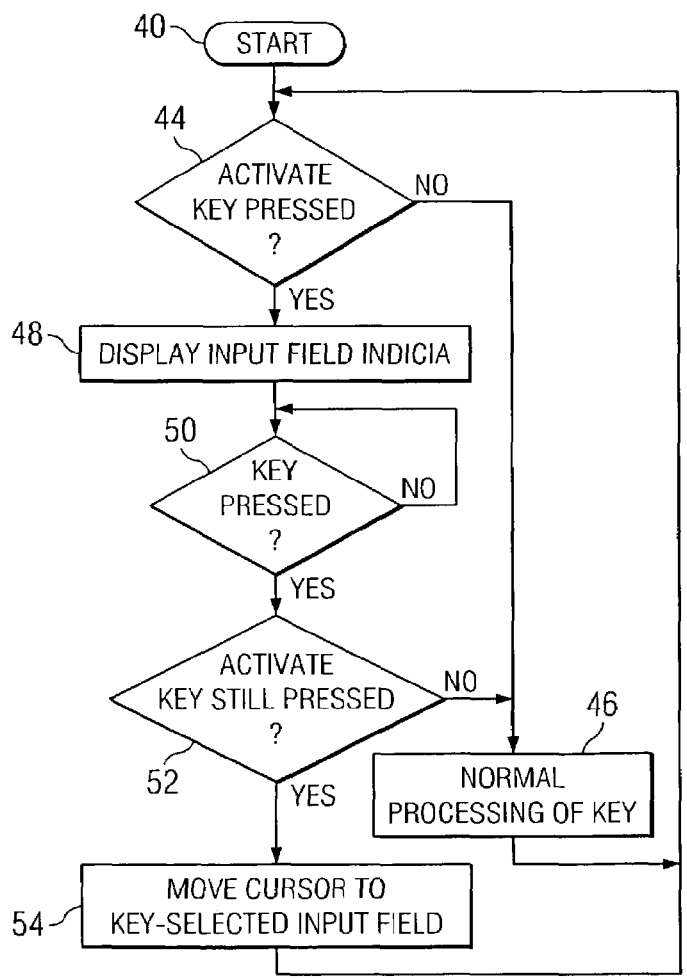
FIG. 6 depicts the logical flow for enabling and using a non-sequential field access mode of operation.

The present invention can be adapted for use with many different types of existing computer applications. This is accomplished by modifying the procedure used to capture/monitor keyboard input from such existing applications, as will now be described with respect to FIG. 6. This procedure shows the logical process used to activate and process the present quick jump invention. However, this is merely a representative flow of the preferred embodiment, and the actual process used may vary due to multi-tasking operating system procedures that occur concurrently.

The process begins at 40. Once a key entry has been detected, a check is made on whether the quick jump feature activation key has been pressed at 44. In the preferred embodiment, the quick jump activation key is the ALT key. If the ALT key was not entered, meaning the quick jump feature is not being enabled by the particular keystroke input, normal processing of the key entry occurs at 46. If the ALT activation key is pressed, as determined at 44, indicia are displayed in each of the input fields at 48. The system then waits for another keystroke at 50. Once a keystroke is detected, a check is made if the ALT activation key is still active (i.e. still being held down by the user) at 52. If so, the cursor used to identify active keyboard entry in the particular window focus is moved to a particular input field, as determined by the particular user input such as a particular number, letter or color corresponding to the desired input field. If not, normal processing of the keystroke occurs at 46 since the ALT activation key is not concurrently being pressed. Again, in a multi-tasking environment, other processes may be running concurrently, and other computer processing may be occurring while waiting for a key to be pressed in the above described procedure.

While the above described preferred embodiment contemplates use of a keyboard or keypad for activating the quick jump feature and selection of what field to jump to when activated, it is also possible to use other user actions to invoke these features. For example, it is possible to use voice and its associated recognition techniques to enter voice commands in lieu of keystrokes to activate the quick jump feature and/or jump to a given input field. In yet another alternate embodiment, the user could use a stylus, finger or other pointing device to activate the quick jump feature.

Figure 7:
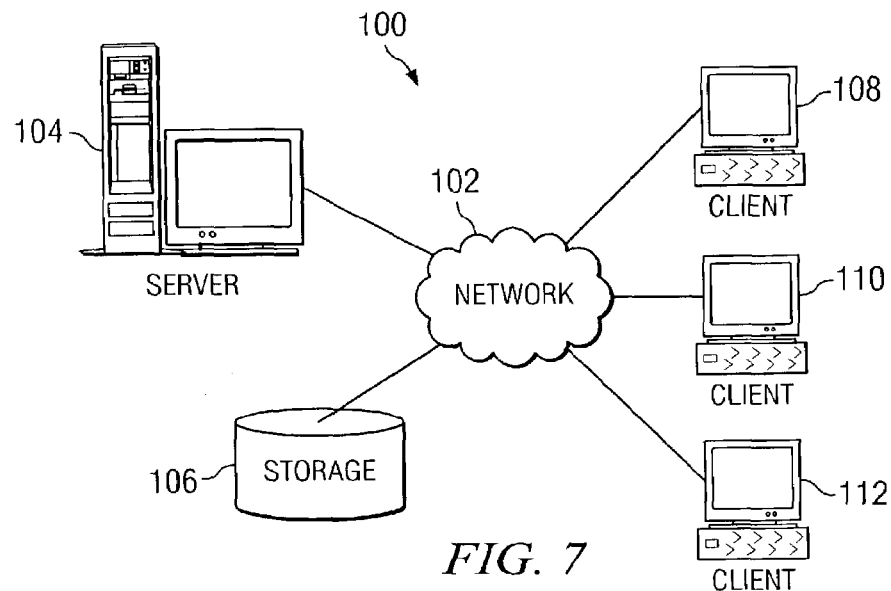
FIG. 7 depicts a pictorial representation of a network of data processing systems in which the present invention may be implemented.

FIG. 7 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 8:
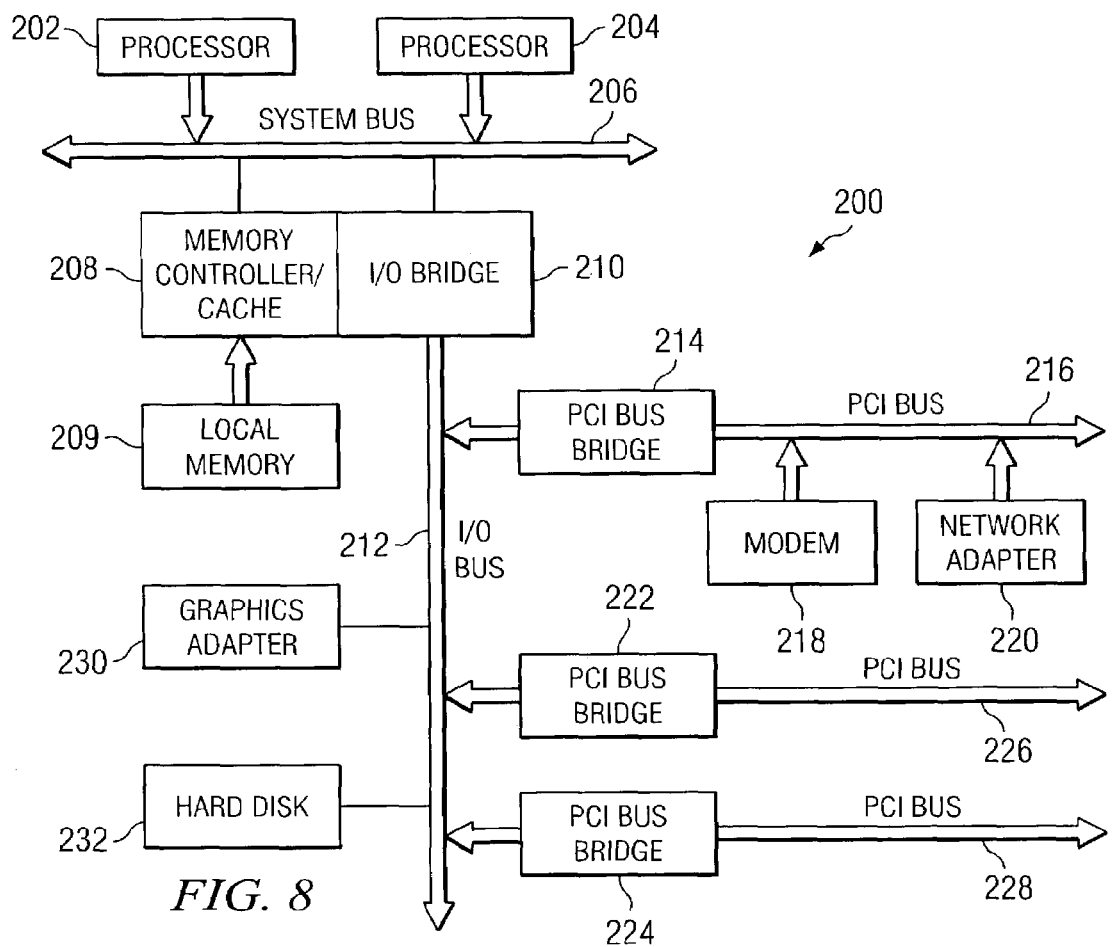
FIG. 8 depicts a block diagram of a data processing system that may be implemented as a server.

Referring to FIG. 8, a block diagram of a data processing system that may be implemented as a server, such as server 104 in FIG. 7, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 8 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 8 may be, for example, an IBM eServer pseries system, a product of International Business Machines Corporation in Armonk, N.Y., running the Advanced Interactive Executive (AIX) operating system or LINUX operating system.

Figure 9:
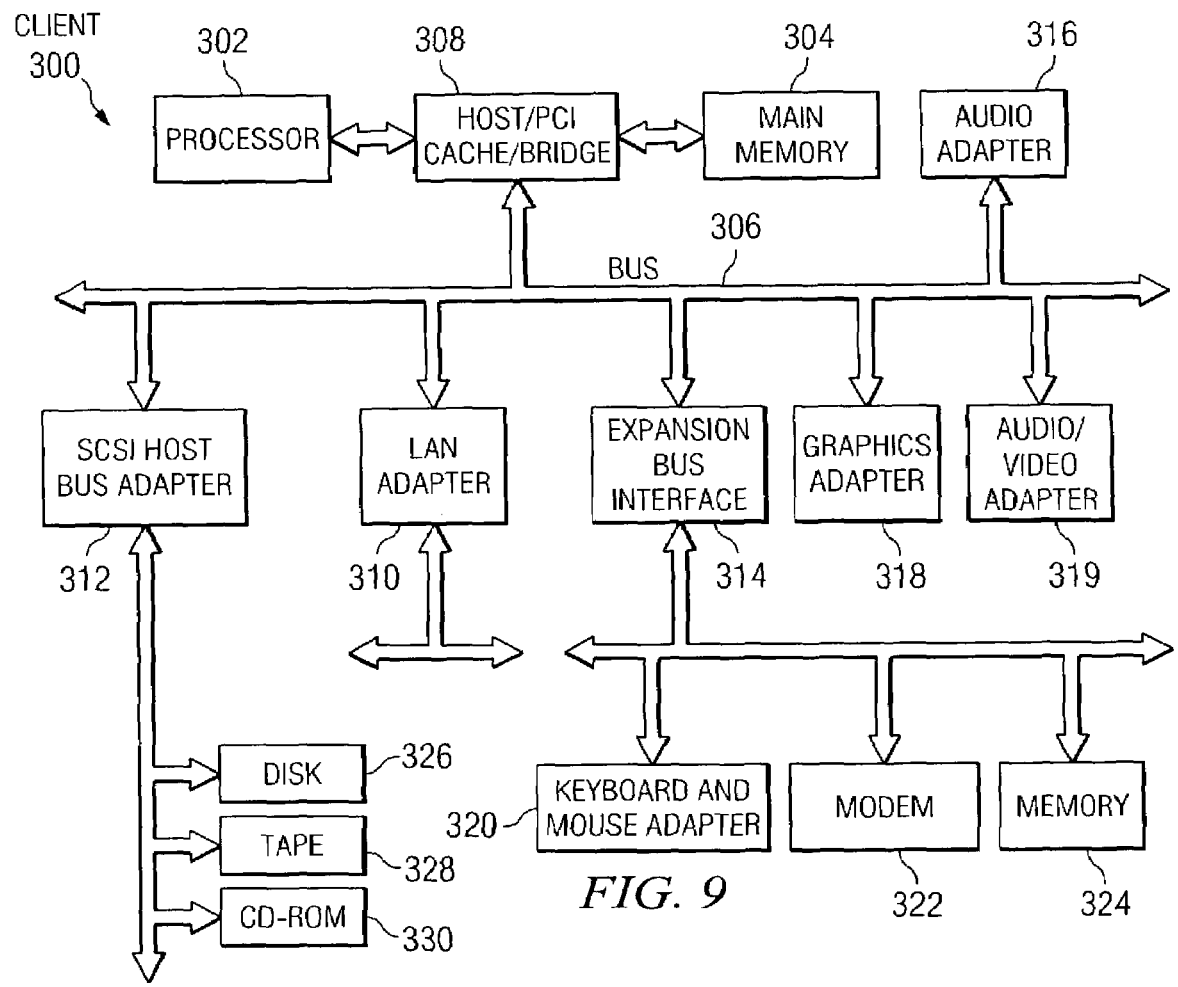
FIG. 9 depicts a block diagram of a data processing system that may be implemented as a client.

With reference now to FIG. 9, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 9. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 9 may vary depending on the implementation. Other internal hardware or peripheral devices, such as flash read-only memory (ROM), equivalent nonvolatile memory, or optical disk drives and the like, may be used in addition to or in place of the hardware depicted in FIG. 9. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 9 and above-described examples are not meant to imply architectural limitations. For example, data processing system 300 also may be a notebook computer or hand held computer in addition to taking the form of a PDA. Data processing system 300 also may be a kiosk or a Web appliance.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for inputting information into an electronic device, comprising the steps of:

activating a non-sequential field access mode of operation;

displaying input field selection indicia as determined by keywords that are each individually associated with a respective text entry field of a plurality of text entry fields that are defined within a hypertext markup language form that is resident on a web site; and moving focus to an input field, the input field being defined by a given one of the text entry fields of the hypertext markup language form, by a web browser as determined by one of the field selection indicia being selected.

2. The method of claim 1, wherein the input field selection indicia is at least one number.

3. The method of claim 1, wherein the input field selection indicia is at least one letter.

4. The method of claim 1, wherein the input field selection indicia is at least one color.

5. The method of claim 1, wherein the activating step is responsive to a key entry on the electronic device.

6. A system for inputting information into an electronic device, comprising:

means for activating a non-sequential field access mode of operation;

means for displaying input field selection indicia as determined by keywords that are each individually associated with a respective text entry field of a plurality of text entry fields that are defined within a hypertext markup language form that is resident on a web site; and means for moving focus to an input field, the input field being defined by a given one of the text entry fields of the hypertext markup language form, by a web browser as determined by one of the field selection indicia being selected.

7. The system of claim 6, wherein the input field selection indicia is at least one number.

8. The system of claim 6, wherein the input field selection indicia is at least one letter.

9. The system of claim 6, wherein the input field selection indicia is at least one color.

10. The system of claim 6, wherein the means for activating is responsive to a key entry on the electronic device.

11. A method for inputting information into a form having a plurality of fields, comprising the steps of:
displaying field selection indicia in at least some of the plurality of the form fields, wherein the plurality of the form fields are defined by text entry fields within the form, and the field selection indicia are displayed as determined by keywords that are each individually associated with a given one of the text entry fields defined within the form;
receiving a field selection from a user; and
moving focus to one of the plurality of the fields by a web browser as determined by the received field selection.

12. A system for inputting information into a form having a plurality of fields, comprising:
means for displaying field selection indicia in at least some of the plurality of the form fields, wherein the plurality of the form fields are defined by text entry fields within the form, and the field selection indicia are displayed as determined by keywords that are each individually associated with a given one of the text entry fields defined within the form;
means for receiving a field selection from a user; and
means for moving focus to one of the plurality of the fields by a web browser as determined by the received field selection.

13. A method in a data processing system, comprising the steps of:
displaying a form having a plurality of input fields, each of the plurality of input fields associated with a separate, unique key sequence; and
jumping to a given input field for receiving user input in response to receipt of a key sequence associated with the given input field by a web browser as determined by a keyword that is associated with a text entry field defined within the form being displayed.

14. A data processing system, comprising:
means for displaying a form having a plurality of input fields, each of the plurality of input fields associated with a separate, unique key sequence; and
means for jumping to a given input field for receiving user input in response to receipt of a key sequence associated with the given input field by a web browser as determined by a keyword that is associated with a text entry field defined within the form.

15. A computer program product in a computer readable media for inputting information into an electronic device, comprising:
means for activating a non-sequential field access mode of operation;
means for displaying input field selection indicia as determined by keywords that are each individually associated with a respective text entry field of a plurality of text entry fields that are defined within a hypertext markup language form that is resident on a web site; and
means for moving focus to an input field, the input field being defined by a given one of the text entry fields of the hypertext markup language form, by a web browser as determined by one of the field selection indicia being selected.

16. A computer program product in a computer readable media for inputting information into a form having a plurality of fields, comprising:
means for displaying field selection indicia in at least some of the plurality of the form fields, wherein the plurality of the form fields arc defined by text entry fields within the form, and the field selection indicia are displayed as determined by keywords that are each individually associated with a given one of the text entry fields defined within the HTML form;
means for receiving a field selection from a user; and
means for moving focus to one of the plurality of the form fields by a web browser as determined by the received field selection.

17. A computer program product in a computer readable media for use in a data processing system, comprising:
means for displaying a form having a plurality of input fields, each of the plurality of input fields associated with a separate, unique key sequence; and
means for jumping to a given input field for receiving user input in response to receipt of a key sequence associated with the given input field by a web browser as determined by a keyword that is associated with a text entry field defined within the form.

* * * * *